Oct. 29, 1968 R. PIOTROWSKI 3,408,112
PROCESS FOR MANUFACTURING BRUSHES FROM A BUNDLE OF LOCKS OF
THREADS AND A DEVICE FOR PERFORMING THIS PROCESS
Filed March 2, 1966 4 Sheets-Sheet 1

INVENTOR
RAFAL PIOTROWSKI
BY Cushman, Darby & Cushman
ATTORNEYS

Oct. 29, 1968 R. PIOTROWSKI 3,408,112
PROCESS FOR MANUFACTURING BRUSHES FROM A BUNDLE OF LOCKS OF
THREADS AND A DEVICE FOR PERFORMING THIS PROCESS
Filed March 2, 1966 4 Sheets-Sheet 2
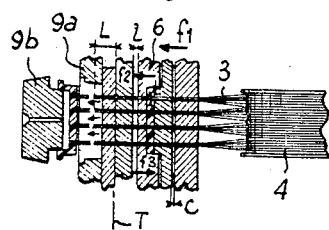
Fig.7
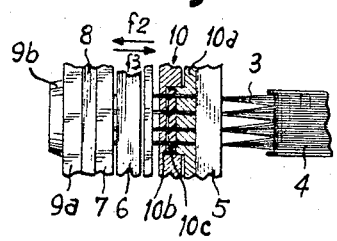
Fig.8
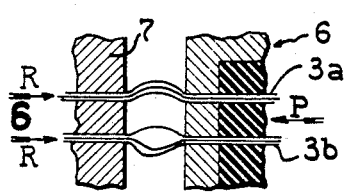
Fig.9
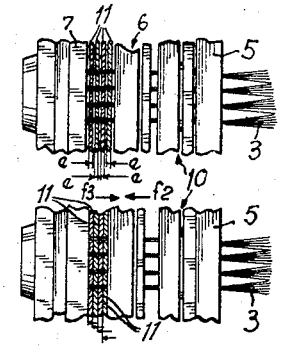
Fig.10
Fig.11
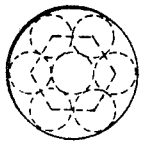
Fig.12
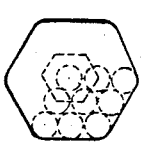
Fig.13
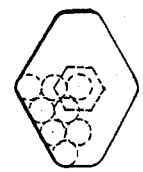
Fig.14
Fig.15
Fig.16
INVENTOR
RAFAL PIOTROWSKI
BY Cushman, Darby & Cushman
ATTORNEYS

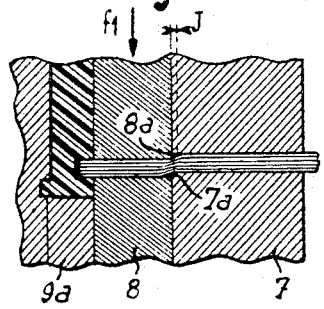
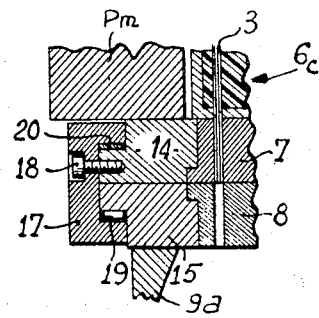
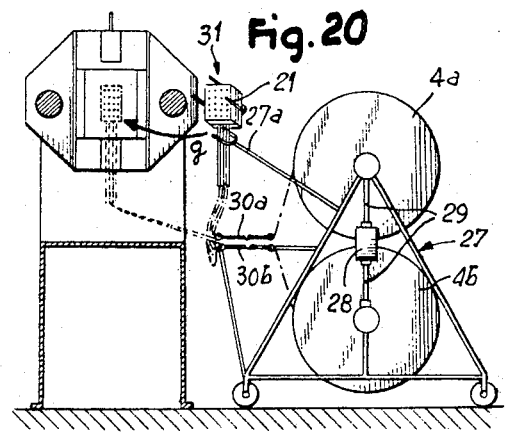
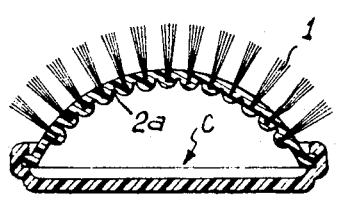
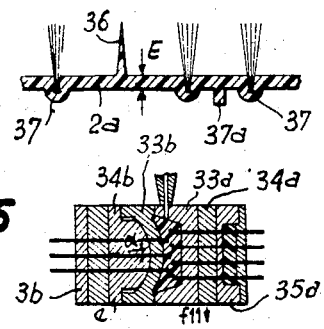

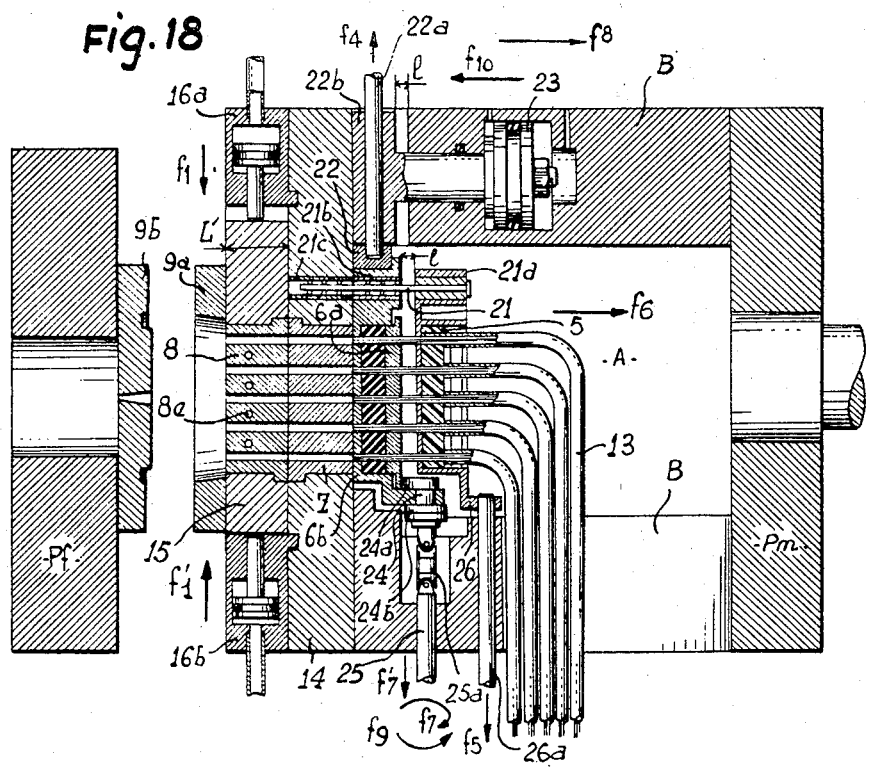

United States Patent Office 3,408,112
Patented Oct. 29, 1968

3,408,112
PROCESS FOR MANUFACTURING BRUSHES FROM A BUNDLE OF LOCKS OF THREADS AND A DEVICE FOR PERFORMING THIS PROCESS
Rafal Piotrowski, 44 Rue Pixerecourt, Paris, France
Filed Mar. 2, 1966, Ser. No. 531,108
Claims priority, application France, Mar. 5, 1965, 8,190
17 Claims. (Cl. 300—21)

ABSTRACT OF THE DISCLOSURE

The process includes the steps of a plurality of elongated locks of thread peripherally at a position spaced from one of the ends thereof, moving said locks through said peripheral gripping action in a direction toward said one end thereof while continuously guidingly supporting the portion of the locks between said one end and the position of peripheral gripping action at positions spaced apart changing distances which at most are less than the critical buckling point of the locks, and relieving the peripheral gripping action, repeating the gripping, moving and relieving steps to advance successive end portions of said locks into a brush forming position, fusing the extremities of the threads of successive end portions of the locks while in said brush forming position, moulding a brush body of thermoplastic material about the heads of successive end portions of the locks while said end portions are held in said brush forming position against longitudinal movement in a direction opposed to the direction of movement of said locks, and severing successive end portions of the locks in said brush forming position at positions spaced from their heads to form tufts.

The apparatus comprises a first moulding member having a plurality of openings therein for receiving the end portions of a plurality of elongated locks of thread, a second moulding member cooperable together with said first member to define therewith a mould cavity within which the extremities of the locks disposed in said openings extend for receiving a thermoplastic material to be moulded about the extremities of the locks, means for severing the locks disposed in the openings of said first moulding member at positions spaced from said mould cavity to form the ends of the tufts of a brush, said moulding members being movable relatively apart to permit removal of a brush from said cavity and said openings and means for advancing said plurality of elongated locks longitudinally to disposed successive end portions thereof within said openings and said cavity.

The present invention concerns an industrial process for the economical manufacturing of brushes through the moulding of the heads of tufts of cut threads in locks arranged in bundles.

The invention also concerns devices making it possible on the one hand to use this process and on the other hand to exploit the maximum capacities of standard injection moulding machines to assure high manufacturing speeds, compatible with very low cost prices.

The invention further concerns a brush manufactured according to this process and with these devices.

Already known are industrial processes making possible the manufacture in series of brushes or analogous items, such as brushes for household cleaning equipment for instance, which contain tufts of threads, kept together in a body at their tops by a plastic material.

Such processes consist successively of the encasing, by thermal moulding of a plastic material, of the heads of the locks of threads arranged in bunches inside a mould-bolster, followed by the drawing out, by the brush body thus moulded, of the bundle of locks, to move the latter for a distance essentially equal to the length of a tuft and, finally, the cutting off of the locks above the bottom of the bolster to separate the brush from the bundle, thus retaining a section of locks for the heads of the tufts of the next brush to be moulded.

But one has not yet succeeded in assuring a satisfactory tightness of the mould channels filled with tufts; under certain conditions of injection the material injected may actually leak into the locks thus causing a production stoppage.

Moreover, the withdrawals of the locks after cutting do not make it possible to obtain sufficiently satisfactory lodging of the lock-heads inside the plastic material to assure a homogenous traction of the latter; the result of this may be the spiralling of the locks in the guide channels which causes defective shapes of the tufts.

Furthermore, because of the stoppages for the arranging into bundles of the locks, the devices for the employment of these processes cause immobilization of the machines, particularly of the injection moulds, which are not compatible with low cost prices.

Finally, stoppages are frequently caused through tangling of the threads of the locks which, made up in spools, are often submitted during their unreeling to torsions which can easily cause entangling.

The present invention has for its aim to remedy these inconveniences.

It concerns a process allowing the production of brushes of the type mentioned above, or analogous ones, at remarkably high speeds and at the same time providing economies of materials.

A procedure has been devised for this, consisting of the application of the above-mentioned operations of guiding, thermal moulding and cutting of locks and characterised in that it consists, for the longitudinal movement of the bundles:

of guiding them into bundle form, the guidance being interrupted above the head of the threads,
of locally girding each lock above the interruption, then
of applying above this girded zone a thrust directed at the head, then
of shouldering, transversely and below the thrust zones, each lock into points mutually spaced at equal distances at the most, at the critical buckling point, then
of relaxing these efforts after movement,
of repeating the cycle of girding and thrusting operations until the locks have moved for the length of a tuft, then
of girding at least part of the locks and of shouldering these latter ones along their entire length, below the girded portions, during the entire duration of moulding.

It will be easily understood that such a process of supplying a mould with brush tufts by pushing the locks instead of by traction makes possible the shortening of the standard operations of cooling and stripping a brush; moreover the ejection of each brush after stripping can be assured by the actual thrusts applied to these tufts by the heads of the tufts meant for the next brush. Consequently, the manufacturing speed can be increased and the amount of plastic material can be limited to that required for holding the encased tufts during use.

Moreover, the girding of the locks and their continuous shouldering assure a sufficiently tight closing of the guide channels as to prevent leakages of plastic material.

Furthermore, the invention relates to a manufacturing device which can be fitted to an injection moulding machine for manufacturing, by the above process, brushes provided with tufts which are perfectly oriented onto their supports.

The invention also concerns a feeding device meant for the very fast feeding, having previously been filled with locks, of a device for the manufacturing of brushes fitted to an injection moulding machine, in order to harmonize the manufacturing speed of the brushes with the injection speed of the mould.

Moreover, the invention concerns brushes which can be produced by this process and with this device.

Finally, the invention relates to a way of placing threads on spools which allows elimination of the curvatures remaining in the threads of the locks meant to fill the feeding device mentioned above.

Other characteristics and advantages of the invention will be seen from the subsequent description relating to the attached drawings, these descriptions and drawings being given only as non-limitative examples.

On these drawings:

FIG. 7 shows on a decreased scale, in longitudinal section and level, the device of FIG. 6.

FIG. 8 shows in diagrammatical section, equipment provided with the device of the preceding figures.

FIG. 9 illustrates, in diagram, the "critical buckling point."

FIGS. 10 and 11 are partial-section diagrams of two characteristic positions of a part for the remedying of buckling.

FIGS. 12 to 16 are transversal section diagrams of channels in the parts of the preceding figures.

FIG. 17 represents on an enlarged scale a detail of the preceding figures.

FIG. 18 shows in vertical section the elements of a device for manufacturing brushes fitted to the platens of an injection moulding machine.

FIG. 19 shows, as a separate part, a detail from FIG. 18.

FIG. 20 shows, in diagram and in transversal elevation, a feeding device for providing a bunch of locks to an injection moulding machine.

FIG. 21 shows, level, an injection machine equipped with a device identical to that of FIGURE 20.

FIG. 22 shows a threading needle for bundles of threads.

FIG. 23 shows in partial section one embodiment of a brush made in accordance with the present invention.

FIG. 24 shows in vertical section another embodiment of a brush made in accordance with the present invention.

FIG. 25 shows in diagrammatical section a device for manufacturing brushes provided with two sets of tufts.

Figure 1:
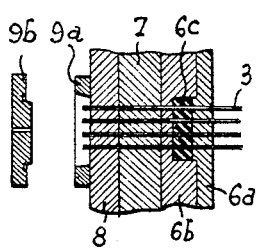
FIGURES 1 to 5 represent in diagrammatical section the elements of a device for manufacturing brushes, in positions corresponding to various stages of the process according to the invention.

On FIG. 1 can be seen bundles of polyamide threads 3, arranged in the form of a lock in the channels of a battery of clamps 6a, 6b and of two blades 7 and 8 of a shear.

These elements will be described in greater detail below, but it will be found that blade 8 forms the bottom of one of the bolsters 9a of a mould which can be fitted to the mobile platens of an injection machine for the injection of polystyrene; the other bolster 9b being fitted to the fixed platen of this injection machine.

It will be noted that the elements of the shear and of the clamp are fitted closely against each other.

The manufacturing process of brushes according to the invention is as follows.

Locks 3 of the bundle, being in the position shown on FIG. 1, clamp battery 6 is kept closed and the locks are firmly held.

Figure 2:
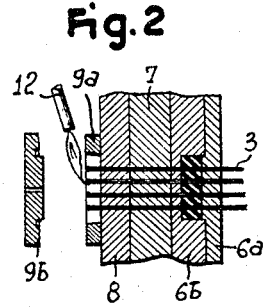
Figure 3:
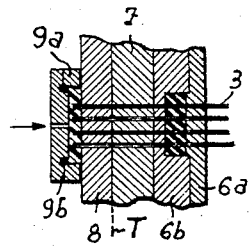

With the platens of the injection machine open (FIG. 2) the ends of the polyamide threads are closely agglomerated by means of the flame from a blowpipe 12 in the shape of a head, next the platens of the injection machine are closed (FIG. 3) and an injection of polystyrene is made to the mould.

Following solidification of the plastic material moulded upon the heads the platens of the injection machine are opened (FIG. 4) and the shear 7, 8 is activated to cut the bundles (arrow $f1$).

After the return of this shear to its initial position (FIG. 5) the clamp battery 6 is activated to push bundles 3 over a distance L into the channels of bolster 8 by a succession of return (arrow $f2$) and outward (arrow $f3$) runs represented by "$l$," until their ends return to the initial position of FIG. 1.

This movement moreover has the effect of ejecting the brush since tufts 1 encased in body 2 are driven from the channels of bolster 8 by the bundles.

It will be explained in detail below how, during moulding, the parts of the bundles are firmly held in the channels of bolster 8 and of blade 7 to assure perfect placing of the tufts on the brush bodies.

On FIG. 6 are seen again the elements of FIGS. 1 to 5, above which is arranged a caliper 5 described in detail below.

Clamp 6 consists of a plug 6a arranged to slide in a housing similar to a buffer 6b at the bottom of which is confined a rubber slab 6c through which the bundles pass with considerable play.

The relative sliding of these two elements 6a–6b, course "$c$" (arrow $f1$, FIG. 7) causes the "endwise" compression of slab 6c which, by wriggling, generates transverse pressures "$t$."

It will be understood that the device forms a battery of radial clamps with elastic jaws making possible the simultaneous girding, delicately, yet with remarkable firmness, of the threads of each lock of a bundle.

Besides the parts controlling the closing (not shown) battery 6a–6b comprises a mechanism (not shown) making possible its longitudinal movement (arrow $f2$).

The forward movement process L of locks 3 is as follows.

After functioning of shears 7, 8, the heads of the bundles being situated at cutting level T, clamp battery 6 is closed (arrow $f1$) and then moved (arrow $f2$) over a distance $l$ (approximately 2 millimeters) corresponding to a fraction (for instance one fifth) of length L (approximately 1 centimeter) of a tuft, while applying a thrust upon the locks.

The clamp is then opened and taken back to its initial position; during the return run of the clamp (arrow $f3$) the locks, freed by the latter, are prevented from moving back by friction inside the guide channels of caliper 5.

This process of advancing and receding of battery 6 continues until the section of locks has been moved over a length L.

For the advance in units $l$, an amount will be selected which is less than the critical height for buckling under the effect of thrusts P and friction resistances R in the channels, to avoid the deformities, diagrammed on FIG. 9, which might cause blocking of the machine.

The difficulties caused by the pushing of the locks will be better understood by indicating that the threads of these locks, made of N30 thread of a diameter of 0.31 millimeter, curve under the effect of a thrust when their guidance is interrupted over a distance beyond 2 millimeters.

Moreover, certain varieties of threads may have a very marked natural tendency to curl and to swell in their locks.

It is therefore to advantage to gird the locks, at at least one point in their guidance zone.

For this (FIG. 8) the above device can be fitted with another clamp battery 10a, 10b, 10c; with buffer 10a for instance being arranged in a fixed position in relation to mould 9.

The means for opening and closing this battery are conjugated to the means controlling clamp 6 in such fashion that:

Clamp 6 being opened; clamp 10 will be closed.

Clamp 6 being closed and in forward (arrow *f2*) and return (arrow *f3*) movement, clamp 10 will be open.

Thus, the movements of these two clamps are inverse and synchronized.

Furthermore, it may be to advantage to obtain movement L of the bundle by a sole run of battery 6.

But to prevent buckling of the locks (FIG. 9) provision has been made for shouldering the locks 3 transversely at points spaced regularly from each other at a distance *c*, slightly less than the "critical buckling point" of these locks 3 during movement push P by means of slabs 11 placed transversely in battery form (FIGS. 10 and 11).

This battery of shouldering slabs is connected with a mechanism which makes possible to synchronize their movements with outward movement (arrow *f2*) and return movement (arrow *f3*) of battery 6; they can move between the extreme positions shown respectively on FIGS. 10 and 11 by successive (or simultaneous) movements in such fashion that the swerve *e* between two neighbouring slabs is at most equal, at the critical buckling point.

It is finally indicated that caliper 5 consists of friction-resisting material and is characterized by a lowest possible friction-coefficient, considering the nature of the threads; this caliper may favourably be made of polytetrafluorethylene which presents surprising disentangling qualities. It permits avoiding putting to work traction forces which are too great and the "wedging" blockages often found in metallic calipers.

Furthermore, the channels of the caliper should preferably have dimensions which are less than those of other parts of the machine: clamp batteries, anti-buckling batteries and shear blades, all of which have a section circumscribed by that of the lock.

Thus, for circular channels the reduction in diameter may be up to 30%.

It will consequently be understood that the threads of locks pulled by battery 6 during an outward movement are induced into the caliper in the manner of a metal thread being extracted from a draw-plate and the threads are thus arranged in the locks, in respect of each other, while keeping their relative positions.

Furthermore, to facilitate the passage of the locks in the channels of the various parts and to generally avoid all the disturbances (curling or overlapping) which may lead to variations in length of the tuft threads, by assuring a perfectly level front of movement, special channel sections have been designed in which each thread is shouldered along its entire course on to at least three neighbouring threads of its lock.

For circular section threads the minimum number of threads to fulfill this condition in a lock must be seven.

This elementary lock forms a basic modulus for locks responsive to various problems in brushmaking, the most conspicuous of which are shown in FIGURES 12–16.

Finally, it is shown that the most interesting channel diagonals correspond to 5, 6 or 7 threads; for these forms and dimensions the channels may be produced by known drilling procedures, such as electro-erosion.

It appears clearly that such devices make it possible to obtain, through thrust, perfectly regular and homogenous advances of locks which consequently are very favourable to high production speeds.

Moreover, it is clear that during moulding the threads of the locks remain firmly shouldered among each other and against the continuous walls of these devices, which are arranged closely against each other. These shouldering effects, combined with the effects of girding, make possible the countermanding of the aleatory effects undergone by the lock-heads under the effort of injection pressures. It is consequently possible to obtain correct forms of the tufts on the brush bodies.

In this connection, under certain injection conditions, notably of plastic materials of low temperature which make possible high production speeds, or in the case of tufts which are fairly long, it may be necessary to reinforce the rigidity of the locks by girding, especially of their sections meant to become tufts.

For this purpose the process consists of priming the closing of the shear (arrow *f1*, FIG. 17) until the thrust applied to the locks is just below the resistance to shearing by the threads of the locks.

But it is quite evident that this girding which reinforces the rigidity of the locks must take place practically at the cutting level.

Actually, if the usual play J (FIG. 17) arranged for film of lubricant of blade 7 on bolster 8 is conserved, the efforts applied by attack lines 7*a*, 8*a* of these parts could be sufficiently displaced in relation to each other to generate a torque which would tend to swing the locks; the threads would then present longitudinal distortions in the form of bends and counterbends, unfavourable to a correct shape of the tufts.

The cutting faces of the bolster and of the blade have therefore been "trued" as perfectly as possible and undergone treatment making it possible to obtain superficial hardnesses considerably above 1000° "Vickers"; in addition an arrangement, described below, makes it possible to reduce their slide play to practically any desired amount.

It will furthermore be understood that for certain varieties of threads presenting sufficient rigidity to resist, by shouldering inside the bolster channels, the injection moulding pressures appropriate to their nature and dimensions, it is possible to shear the tufts before moulding. The process then simply consists of closing the channels above the tufts by means of the shear blade during the entire duration of moulding.

Moreover, the devices described above may be produced in the form of mechanisms which can be fitted rapidly and easily to a conventional injection machine.

On FIG. 18 can be seen a bolster 9*b* fitted to the fixed platen P*f* of a conventional injection machine of which the mobile platen P*m* is fitted, by means of arms B with A bolster 8 and a shearing blade 7 and A clamp battery 6*a*, 6*d* connected with a guiding caliper 5, fitted with tubes 13 for the protection and threading of locks.

Blades 7 and 8 are fitted respectively to a frame 14, integral with arms B and inside a frame 15.

This frame 15 can be controlled, when sliding, by a closing jack 16*a* (arrow *f1*) and by an opening jack 16*b* (arrow *f'1*) integral with frame 14.

Actually, (FIG. 19) these frames 14 and 15 form, on two opposite borders, tenons engaged in the slots of two crossbars 17 attached, parallel to each other, to frame 14 by screws 18.

Frame 15, mounting bolster 8, can slide on the one hand on structure 14 and on the other hand on the wheels of roller 19 fitted parallel to each other in a rolling cage and commonly called "needle skate."

The lateral action of such a sliding mechanism can be adjusted to a required amount by the more or less firm locking of a key 20 in the form of a very sharp angle engaged, prior to tightening of screw 18, between the lateral faces of the shear of crossbar 17 and the tenon of frame 14.

It will be understood that this mechanism, to which bolster 9*a* is connected, represents a device for the manufacture of brushes which can be fitted to a conventional injection machine, of which the action of the shear can be reduced to any desired slightness of degree. However, a "dry" sliding of the blades of this shear is possible and can be very gentle by means of needle skates 19.

Referring again to FIG. 18 it can be seen that the clamp battery 6 and the guiding caliper 5 are connected to each other by rods 21 (of which only one is visible on this drawing), fitted to cheeks 21*a* of the caliper structure and fitted on the one hand, inside bushings 21*b* integral with buffer 6b and on the other hand inside sleeves 21c fixed to frame 14.

These bushings and sleeves are lined with ball bearings, sleeves 21b making possible a slide "l" of the clamp battery on rods 21 and sleeves 21c making possible the rapid fitting and dismounting of the device battery 6 caliber 5 on frame 14, assuring a precise alignment of their channels with those of the shear.

Furthermore buffer 6b comprises a boss 22 forming a bearing for shaft 22a engaged in crosshead 22b of the piston-rod of a jack 23 fitted to upper arm B.

The lower side of buffer 6b forms a cheek comprising a shaft-bearing 22 to which are fitted, on each side of the cheek, a drive-cam 24a of plug 6a (course "c") and a coupling part by means of dog clutches 24b fitted to a binetic Hooke's coupling or universal joint 25a which itself is fixed to the end of a shaft 25 fitted to a bearing of lower arm B of platen P$m$.

The structure of caliper 5 comprises a lug 26 forming a hole in which is engaged, with a little play, a driftpin 26a, arranged for "greasy friction" and bolted to lower arm B.

It is indicated that tubes 13 consist of polytetrafluoroethylene which facilitates the gliding of the locks; their lower ends being fixed to the upper face of caliper 5 by a standard wall-plate system.

The preceding description makes it possible to understand that

Because of rods 21, clamp battery 6 and caliper 5 provided with tubes 13 form a device for feeding locks to the bolster-shear manufacturing device Because of rods 21 and driftpin 26a this device can be very rapidly fitted and dismounted on this manufacturing device which itself is attached to the platen of the injection machine.

To dismount it all that is necessary is to remove (arrow f4) shaft 22a from boss 22,
push back shaft 25 (arrow f7) to dismount coupling 24b,
remove (arrow f5) driftpin 26a from lug 26,
then separate (arrow f6) the feeding device from frame 14; rods 21 will then slide in sleeves 21c.

For fitting to platen P$m$ it suffices to perform the reverse operations; the alignment in a precise fashion of the feeding and manufacturing devices being assured by engaging rods 21 inside sleeves 21c.

The essential phases in the manufacture of a brush are thus as follows.

The feeding device being filled with locks of which the sections have previously been shorn at the level of the free face of buffer 6b and while the clamp battery is closed (FIG. 18):

Shaft 25 is activated (arrow f7) to drive open the clamps (course c of buffer 6a), The piston of jack 23 is moved (arrow f8) to carry along over a distance $l$ clamp battery 6a, 6b. This movement is possible because coupling 25a changes form and sleeves 21b slide on rods 21; these being immobilised inside sleeves 21c and lugs 21a of caliper 5 being locked by driftpin 26a, Shaft 25 is activated (arrow f9) to shut the clamp, Jack 23 is activated (arrow f10) to move the clamp battery and the locks are pushed into the channels of shear 7 for a distance $l$.

Figure 5:
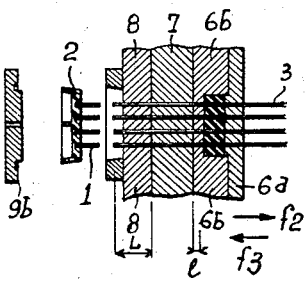
Figure 6:
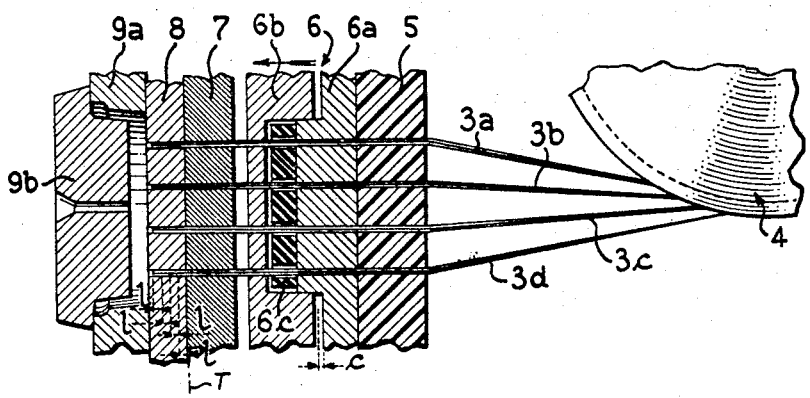
FIG. 6 represents in diagram, on an enlarged scale, a longitudinal section of the device of FIGURES 1 to 5.

The operations of this cycle are repeated until the lock sections pass beyond the internal face of the bolster in the position shown on FIGS. 1 and 5.

Figure 4:
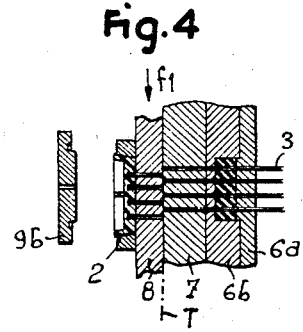

The agglomeration operations of the head (FIG. 2), of closing platen P$m$ and of moulding (FIG. 3) are performed, Jacks 16a and 16b are activated for the cutting of the tufts (FIG. 4).

The preceding operations cycle is repeated for the ejection of the brush and for production of another brush; however the number of runs "$l$" of jack 23 is slightly less than the number shown above since the lock sections are situated, at the start at the shearing level of blades 7 and 8.

For application to the locks at sectioning level of a pressure slightly below the resistance to shearing of their threads, it may be advantageous to use a perfected jack-type described in U.S. Patent No. 3,150,571 of Frasetto et al., applied for on May 14, 1963 and granted on Sept. 29, 1964.

This jack forms in effect a hydraulic pressure locking device with a very high degree of proper functioning.

Feeding devices with sliding rods 21, fitted with clamp and shouldering batteries identical to the devices of FIGS. 8, 10 and 11 could of course be provided.

Furthermore, during the functioning of an injection machine fitted with these manufacturing devices the supply of a second lock feeding device has been devised, as indicated below.

On FIGS. 20 and 21 can be seen spools 4a and 4b fitted to shafts arranged on a support 27 so that these spools can be made to rotate by an electric motor 28 and by their movement transmission parts 29.

Each of these spools comprises threads, wound over each other and spirally from turn to turn on a drum; these threads are arranged next to each other between the wings of the spool, so that the spool is formed by a pile of discs corresponding to each thread and of which the thickness is consequently equal to the diameter of one thread.

Next, the set of threads can be unrolled, without the threads retaining any helicoidal twist, like a regular sheet; they are, then, prefectly rectilinear and can be selected by engagement between the teeth of combs 30a and 30b, fastened to the support, to form a bundle of locks 3 (FIG. 21).

These locks are fed into the channels of a mould feeding device to shear 31 placed on a fork 27a.

To perform this operation the ends of the threads of a lock 3 are agglomerated, by pasty fusion or gluing for instance, in the form of a pellet encasing the head of a needle 32 (FIG. 22) consisting of a flexible and tough steel wire of small diameter (in the order of $\frac{2}{10}$ of a millimeter).

Each lock thus provided with its needle can be led into a tube 13 and into the corresponding channel of the feeding device.

After threading, one need only to shear the locks, with the help of a knife, on the edge of buffer 6b, to make the feeding device ready for coupling to the manufacturing device of the machine (arrow g).

Consequently, owing to these arrangements and to a set of two feeding devices, the functioning of an injection machine fitted with such a manufacturing device will only be interrupted during the very short lapse of time corresponding to the dismounting of a feeding device emptied of locks, followed by the fitting of the other device, filled with locks.

Under these circumstances the manufacturing speed will be near the injection speed of which the machine is capable, this being favourable to the reduction of the cost price of the brushes.

Furthermore, it is quite clear that this process, owing to these devices, allows the economic manufacturing of brushes of many varied types, applicable to many different brushing problems.

Thus, on FIG. 25 can be seen a mould with two bolsters 33a and 33b fitted respectively with cutting blades 34a, 34b.

These bolsters-cum-shears are arranged top against bottom and equipped with lock feeding devices 35a, 35b to form a moulding device which can be fitted transversely to the mobile platen of an injection machine in such fashion that its parts will be activated as described above.

This device will make it possible to manufacture brushes having two opposite brushing surfaces and it will be noted that the surface corresponding to shear 34b is of cylindrical form.

The simultaneous shearing of the tufts on the opposing surfaces can be effected by rectilinear sliding of mould 33a, 33b, following a perpendicular line on the plan of the drawing.

But one could provide:

a slide of blade 34a (arrow f11) and
a slight rotation "a" of blade 34b: shoulders "e" of this blade being notched in a way which makes possible this rotation.

One could also, within the framework of the invention, arrange inside bolsters 8 or 33, channels very slightly converging or diverging to obtain an opened or closed fan of tufts,
one-eyed holes arranged between the lock channels and forming a moulding taper of teeth or spines 36 (FIG. 23); thus would be obtained brushes with standard thread tufts paired with teeth of plastic material.

Furthermore, with the aim of economy of material, the thickness E (FIG. 23) of the brush body can be reduced by an amount corresponding to the utilisation stress, the necessary resistance during housing of the tufts being assured by bosses 37 corresponding to cavities arranged in bolster 9b.

For flexible plastics one could produce flat, thin cores which can be bent and engaged by their rim in a body C or a sleeve (FIG. 24).

Finally, it will be noted that, all these brushes being ejected by the locks, the customary ejection punches are not required and consequently the body will not show any traces of ejection punch marks and will be perfectly smooth; this is a characteristic by which articles manufactured according to the invention can be identified.

It will be understood that this invention is not limited to the terms of the preceding description but, on the contrary, covers any and all variations feasible to a craftsman.

I claim:

1. A process for forming brushes which comprises the steps of gripping a plurality of elongated locks of thread peripherally at a position spaced from one of the ends thereof, moving said locks through said peripheral gripping action in a direction toward said one end thereof while continuously guidingly supporting the portion of the locks between said one end and the position of peripheral gripping action at positions spaced apart changing distances which at most are less than the critical buckling point of the locks, and relieving the peripheral gripping action, repeating the gripping, moving and relieving steps to advance successive end portions of said locks into a brush forming position, fusing the extremities of the threads of successive end portions of the locks while in said brush forming position, moulding a brush body of thermoplastic material about the heads of successive end portions of the locks while said end portions are held in said brush forming position against longitudinal movement in a direction opposed to the direction of movement of said locks, and severing successive end portions of the locks in said brush forming position at positions spaced from their heads to form tufts.

2. A process as defined in claim 1 wherein the guiding support of the portion of the locks between said one end and the peripheral gripping action is continuously maintained during the repetition of said gripping, moving and releasing steps.

3. A process as defined in claim 2 wherein said continuous guiding support for each lock comprises circumferentially confining each lock so as to cause each thread of the locks to abuttingly engage at least two adjacent threads.

4. The process as defined in claim 1 wherein said lock end portions are held against longitudinal movement during said moulding by applying shearing forces to said locks at said position of severance of a magnitude less than that necessary to actually sever the locks.

5. A process as defined in claim 1 wherein said severing step is performed prior to the moulding step and said end portions are held against longitudinal movement during the moulding step by abuttingly supporting the severed ends of the lock end portions.

6. A process as defined in claim 1 wherein successive severed end portions of said locks with brush bodies moulded about their heads in said brush forming position are moved out of said brush forming position by the movement of successive end portions into said brush forming positions through interengagement of the severed ends of said locks.

7. A process as defined in claim 1 wherein said gripping, moving and relieving steps are repeated a plurality of times to effect movement of each successive end portion into said brush forming position.

8. Apparatus for making brushes comprising a first moulding member having a plurality of openings therein for receiving the end portions of a plurality of elongated locks of thread, a second moulding member cooperable together with said first member to define therewith a mould cavity within which the extremities of the locks disposed in said openings extend for receiving a thermoplastic material to be moulded about the extremities of the locks, means for severing the locks disposed in the openings of said first moulding member at positions spaced from said mould cavity to form the ends of the tufts of a brush, said moulding members being movable relatively apart to permit removal of a brush from said cavity and said openings and means for advancing said plurality of elongated locks longitudinally to disposed successive end portions thereof within said openings and said cavity; said severing means comprising a shear plate having openings extending therethrough for receiving said locks and a planar surface, said first moulding member including a planar surface abuttingly receiving the planar surface of said shear plate, and means for effecting a relative transverse movement between said first moulding member and said shear plate with said planar surfaces in sliding contact; a roller bearing assembly mounted between said first moulding member and said shear plate engageable when said planar surfaces are in sliding contact and key means retaining said surfaces in contact.

9. Apparatus for making brushes comprising a first moulding member having a plurality of openings therein for receiving the end portions of a plurality of elongated locks of thread, a second moulding member cooperable together with said first member to define therewith a mould cavity within which the extremities of the locks disposed in said openings extend for receiving a thermoplastic material to be moulded about the extremities of the locks, means for severing the locks disposed in the openings of said first moulding member at positions spaced from said mould cavity to form the ends of the tufts of a brush, said moulding members being movable relatively apart to permit removal of a brush from said cavity and said openings and means for advancing said plurality of elongated locks longitudinally to disposed successive end portions thereof within said openings and said cavity; said severing means comprising a shear plate having openings extending therethrough for receiving said locks and a planar surface, said first moulding member including a planar surface abuttingly receiving the planar surface of said shear plate, and means for effecting a relative transverse movement between said first moulding member and said shear plate with said planar surfaces in sliding contact; said relative movement effecting means comprising a pair of opposed fluid pressure operated jack units; means for alternatively applying fluid pressure to said jack units of a value insufficient to shear locks received in said openings but sufficient to apply a gripping action thereto and of a value sufficient to shear such locks.

10. Apparatus for making brushes comprising a first moulding member having a plurality of openings therein for receiving the end portions of a plurality of elongated locks of thread, a second moulding member cooperable together with said first member to define therewith a mould cavity within which the extremities of the locks disposed in said openings extend for receiving a thermoplastic material to be moulded about the extremities of the locks, means for severing the locks disposed in the openings of said first moulding member at positions spaced from said mould cavity to form the ends of the tufts of a brush, said moulding members being movable relatively apart to permit removal of a brush from said cavity and said openings and means for advancing said plurality of elongated locks longitudinally to disposed successive end portions thereof within said openings and said cavity; said advancing means comprising a clamp assembly including means for applying a peripheral gripping action to each of said locks, means for actuating and releasing said gripping means, and means for effecting a reciprocatory movement of said gripping means longitudinally of said locks so that movement in one direction with said gripping means applied will advance said locks and movement in the opposite direction with said gripping means released will reposition said gripping means with respect to said locks for another advancing movement.

11. Apparatus as defined in claim 10 wherein said advancing means includes a second clamping assembly similar to said first clamp assembly operable to effect an advancing movement of said locks during the repositioning movement of said first clamp assembly and to effect a repositioning movement during the advancing movement of said first clamp assembly.

12. Apparatus as defined in claim 10 wherein said gripping means comprises a first rigid member having a recess therein and a plurality of openings receiving said locks therethrough communicating with said recess, a second compressible member of elastic material disposed within said recess having a plurality of openings receiving said locks therethrough and a third rigid member having a plurality of openings receiving said locks therethrough movable toward and away from said first rigid member to compress and relieve said compressible member within said recess therebetween.

13. Apparatus as defined in claim 12 including a caliper member mounted in fixed relation to said shear plate with said first, second and third members therebetween, said caliper member including a plurality of openings receiving said locks therethrough.

14. Apparatus as defined in claim 13 wherein said caliper member is mounted in fixed relation to said shear plate by means of a plurality of longitudinally extending rods, said first rigid member being mounted on said rods for reciprocatory movement thereon between said shear plate and said caliper member.

15. Apparatus as defined in claim 10 including a plurality of anti-buckling plates between said shear plate and said gripping means having aligned openings receiving said locks operable during the reciprocatory movement of said gripping means to guidingly support the locks at positions spaced apart varying distances which at most are less than the critical buckling point of the locks.

16. Apparatus for making brushes comprising a first moulding member having a plurality of openings therein for receiving the end portions of a plurality of elongated locks of thread, a second moulding member cooperable together with said first member to define therewith a mould cavity within which the extremities of the locks disposed in said openings extend for receiving a thermoplastic material to be moulded about the extremities of the locks, means for severing the locks disposed in the openings of said first moulding member at positions spaced from said mould cavity to form the ends of the tufts of a brush, said moulding members being movable relatively apart to permit removal of a brush from said cavity and said openings and means for advancing said plurality of elongated locks longitudinally to disposed successive end portions thereof within said openings and said cavity; said severing means comprising a shear plate having openings extending therethrough for receiving said locks and a planar surface, said first moulding member including a planar surface abuttingly receiving the planar surface of said shear plate, and means for effecting a relative transverse movement between said first moulding member and said shear plate with said planar surfaces in sliding contact; each of said first moulding member and shear plate openings being of similar polygonal cross-sectional configuration of a size to engage the periphery of the lock received therein and retain each of the threads of the lock in abutting relation to at least two adjacent threads.

17. Apparatus for making brushes comprising a first moulding member having a plurality of openings therein for receiving the end portions of a plurality of elongated locks of thread, a second moulding member cooperable together with said first member to define therewith a mould cavity within which the extremities of the locks disposed in said openings extend for receiving a thermoplastic material to be moulded about the extremities of the locks, means for severing the locks disposed in the openings of said first moulding member at positions spaced from said mould cavity to form the ends of the tufts of a brush, said moulding members being movable relatively apart to permit removal of a brush from said cavity and said openings and means for advancing said plurality of elongated locks longitudinally to disposed successive end portions thereof within said openings and said cavity; a support for a pair of drum spools containing a multiplicity of elongated individual threads, comb means carried by said support for guiding and grouping said individual threads into a plurality of locks, and means for selectively rotating said spools.

References Cited

UNITED STATES PATENTS 2,655,409   10/1953   Baldanza _____ 300—21

FOREIGN PATENTS 708,733   5/1954   Great Britain.
790,151   2/1958   Great Britain.
845,933   6/1953   Germany.

TRAVIS S. McGEHEE, *Primary Examiner.*